United States Patent
Deivasigamani et al.

(10) Patent No.: US 11,815,272 B2
(45) Date of Patent: Nov. 14, 2023

(54) LEGIONELLA THREAT ASSESSMENT AND MITIGATION SYSTEM AND METHOD

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 798 days.

(21) Appl. No.: 16/923,365

(22) Filed: Jul. 8, 2020

(65) Prior Publication Data
US 2021/0010681 A1    Jan. 14, 2021

Related U.S. Application Data

(60) Provisional application No. 62/871,682, filed on Jul. 8, 2019.

(51) Int. Cl.
*F24D 17/00*    (2022.01)
*E03B 7/07*    (2006.01)
*C02F 1/02*    (2023.01)

(52) U.S. Cl.
CPC ............ *F24D 17/0073* (2013.01); *C02F 1/02* (2013.01); *E03B 7/074* (2013.01); *F24D 17/0078* (2013.01); *C02F 2303/04* (2013.01); *C02F 2307/14* (2013.01)

(58) Field of Classification Search
None
See application file for complete search history.

(56) References Cited

U.S. PATENT DOCUMENTS

| | | | |
|---|---|---|---|
| 8,985,063 B2* | 3/2015 | Adachi | F24H 15/215 |
| | | | 122/448.1 |
| 10,501,338 B2* | 12/2019 | Lesage | F24H 9/14 |
| 11,053,149 B2* | 7/2021 | Hank | E03B 7/04 |
| 2019/0093904 A1* | 3/2019 | Cuervo-Arango Y De Cachavera | F24D 17/00 |
| 2020/0156976 A1* | 5/2020 | D'Amore | C02F 9/00 |
| 2020/0317536 A1* | 10/2020 | Moore | C02F 1/281 |
| 2021/0215352 A1* | 7/2021 | van Kerkhove | G06F 30/28 |

FOREIGN PATENT DOCUMENTS

| | | | | |
|---|---|---|---|---|
| DE | 102016102014 A1 * | 8/2016 | | E03B 7/04 |
| DE | 102013114889 C5 * | 11/2022 | | B01D 63/16 |
| EP | 3147577 A1 * | 3/2017 | | E03B 7/07 |

OTHER PUBLICATIONS

Legionella and water temperatures go hand-in-hand—the fine print when dealing with Legionella bacteria in plumbing systems, website, https://www.pmengineercomiarticles/90962-legionella-and-water-temperatures-go-hand-in-hand, BNP Media.

\* cited by examiner

*Primary Examiner* — Peter J Macchiarolo
*Assistant Examiner* — Jermaine L Jenkins
(74) *Attorney, Agent, or Firm* — Jong Patent Firm; Cheng Ning Jong; Tracy P. Jong

(57) ABSTRACT

A method for providing a warning of the risk of *Legionella* in a fluid conductor, the method including determining the percentage of a duration a fluid is disposed in the fluid conductor at a temperature in which *Legionella* can thrive during a period, wherein if the percentage of the duration is greater than about 50% of the period, a first indication of a risk of *Legionella* is raised.

9 Claims, 8 Drawing Sheets

LEGIONELLA THREAT ASSESSMENT AND MITIGATION SYSTEM AND METHOD

PRIORITY CLAIM AND RELATED APPLICATIONS

This non-provisional application claims the benefit of priority from provisional application U.S. Ser. No. 62/871,682 filed Jul. 8, 2019. Said application is incorporated by reference in its entirety.

BACKGROUND OF THE INVENTION

1. The Field of the Invention

The present invention relates to a *Legionella* threat assessment and mitigation system and method. More specifically, the present invention is directed to a *Legionella* threat assessment and mitigation system and method that is specific to a water supply system fluidly connected to a water heating system.

2. Background Art

*Legionella* or more specifically *Legionella pneumophila*, commonly called legionellosis, has been the subject of numerous studies conducted in order to better understand agents having an effect upon the proliferation of this bacterium particularly at water heaters. Traditionally, in ascertaining the presence of *Legionella*, samples must be collected and tested for *Legionella*. According to https://www.pmengineer.com/articles/90962-legionella-and-water-temperatures-go-hand-in-hand, legionellosis survive at water temperature of 20 degrees C. (68 degrees F.) and under but dormant, grow between 20 degrees C. (68 degrees F.) and 50 degrees C. (122 degrees F.). Left at a temperature of about 55 degrees C. (131 degrees F.), legionellosis die within 5 to 6 hours. Left at a temperature of about 60 degrees C. (140 degrees F.), legionellosis die within 32 minutes. Left at a temperature of about 66 degrees C. (150.8 degrees F.), legionellosis die within 2 minutes. At 70 degrees C. (158 degrees F.) or above, legionellosis is killed. A water heating system typically experiences a wide range of water temperature as some hot water is left dwelling in the system before cooling down to room temperature of the mechanical room in which the water heater is disposed if demands are sporadic and infrequent.

Further, the potential for *Legionella* is more pronounced in a tank system or a large fluid conductor, e.g., a tank water heater, etc., due to stratification of the contents of the tank water heater. Although one or more temperature sensors may be used for providing feedback to heating of the contents of the tank water heater to achieve a setpoint temperature, the effect of stratification can cause layers of fluid having different temperatures. Therefore, although portions of the contents of a water heater may be disposed at a setpoint temperature that is unfavorable for *Legionella* proliferation, there potentially exists other portions that may be disposed at temperatures suitable for *Legionella* proliferation.

U.S. Pat. Pub. No. 20170277866 of Botella et al. (hereinafter Botella) discloses a method to determine proliferation risk of *Legionella* sp. and total aerobes, and to quantify their populations in all types of plants entailing potential proliferation and/or dissemination of these bacteria; firstly it performs previous calculations with previously measured source data in order to identify fundamental parameters for calculations. Secondly, data are sent from the user station to the central processor for processing and storage purposes. Thirdly, data are returned from the central server to the user station for storage and evaluation purposes. Botella employs a method that provides real time, quantitative and qualitative estimates of the presence of aerobic bacteria and particularly *Legionella* sp., thereby involving a significant amount of computations and numerous parameters.

There exists a need for assessing the risk of *Legionella* proliferation in a body of fluid without testing so that users of the body of fluid can be warned of potential risks linked to *Legionella*. There also exists a need for an assessment of *Legionella* risk that takes advantage of the data already available in a water heating system.

SUMMARY OF THE INVENTION

In accordance with the present invention, there is provided a method for providing a warning of the risk of *Legionella* in a fluid conductor, the method including determining the percentage of a duration a fluid is disposed in the fluid conductor at a temperature in which *Legionella* can thrive during a period, wherein if the percentage of the duration is greater than about 50% of the period, a first indication of a risk of *Legionella* is raised.

In one embodiment, the method further includes:
(a) identifying a flow volume of the fluid through the fluid conductor during the period to yield a flow volume per unit period; and
(b) comparing the flow volume per unit period to a threshold, wherein if the flow volume per unit period is less than the threshold, a second indication of a risk of *Legionella* is raised.

In one embodiment, the threshold is the total fluid volume of the fluid conductor within the period. In one embodiment, the period is about 6 hours. In one embodiment, the method further includes providing a warning indicating that the fluid in the fluid conductor should be replaced if the first indication is raised. In one embodiment, the method further includes providing a warning indicating that the fluid in the fluid conductor should not be consumed by humans without further treatment if the first indication of a risk of *Legionella* is raised.

In accordance with the present invention, there is provided a method for mitigating the risk of *Legionella* in a fluid conductor, the method including:
replacing the volume of the fluid in the fluid conductor at least once during a period.

In one embodiment, the period is about 3 hours. In one embodiment, the method further includes:
providing a warning indicating that the volume of the fluid in the fluid conductor should not be consumed by humans without further treatment.

In accordance with the present invention, there is provided a method for mitigating the risk of *Legionella* in a fluid conductor, the method including:
(a) ensuring a volume of fluid contained in the fluid conductor is disposed at a temperature of at least about 70 degrees C.; and
(b) circulating the volume of fluid for at least about 2 minutes.

An object of the present invention is to provide a *Legionella* threat assessment system and method based on analysis of readily available sensor data of a water heating system.

Another object of the present invention is to provide a *Legionella* threat mitigation system and method based on analysis of readily available sensor data of a water heating system.

Another object of the present invention is to provide a *Legionella* threat mitigation system and method using readily available equipment of a water heating system to lower the *Legionella* threat.

Another object of the present invention is to provide a system that warns that a *Legionella* threat is developing in a fluid system such that this threat can be prevented or handled according to a health care protocol.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—water heater
4—safety controller
6—valve
8—status indicator
10—temperature sensor
12—temperature sensor
14—temperature sensor
16—temperature sensor
18—flow sensor
20—point of use
22—pump
24—riser
26—cold water inlet
28—section
30—section
32—section
34—section
36—valve

PARTICULAR ADVANTAGES OF THE INVENTION

In one embodiment, the present assessment and mitigation system utilizes readily available water heating equipment in assessing *Legionella* risk, thereby allowing this assessment and mitigation to be carried out at existing water heating facilities. No additional hardware or flush sequences with or without disinfectant are required to add assessment and mitigation capabilities if the existing water heating facilities have not been known to have shut down, e.g., due to the lack of demand and closure of the existing water heating facilities, etc., over an extended period of time or a period of time sufficient for *Legionella* proliferation to occur. In one embodiment, the present assessment and mitigation system utilizes a minimal number of sensors, e.g., temperature and flow sensors, installed in branches of a water supply system to more accurately assess *Legionella* risks associated with equipment supplied by the water supply system.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
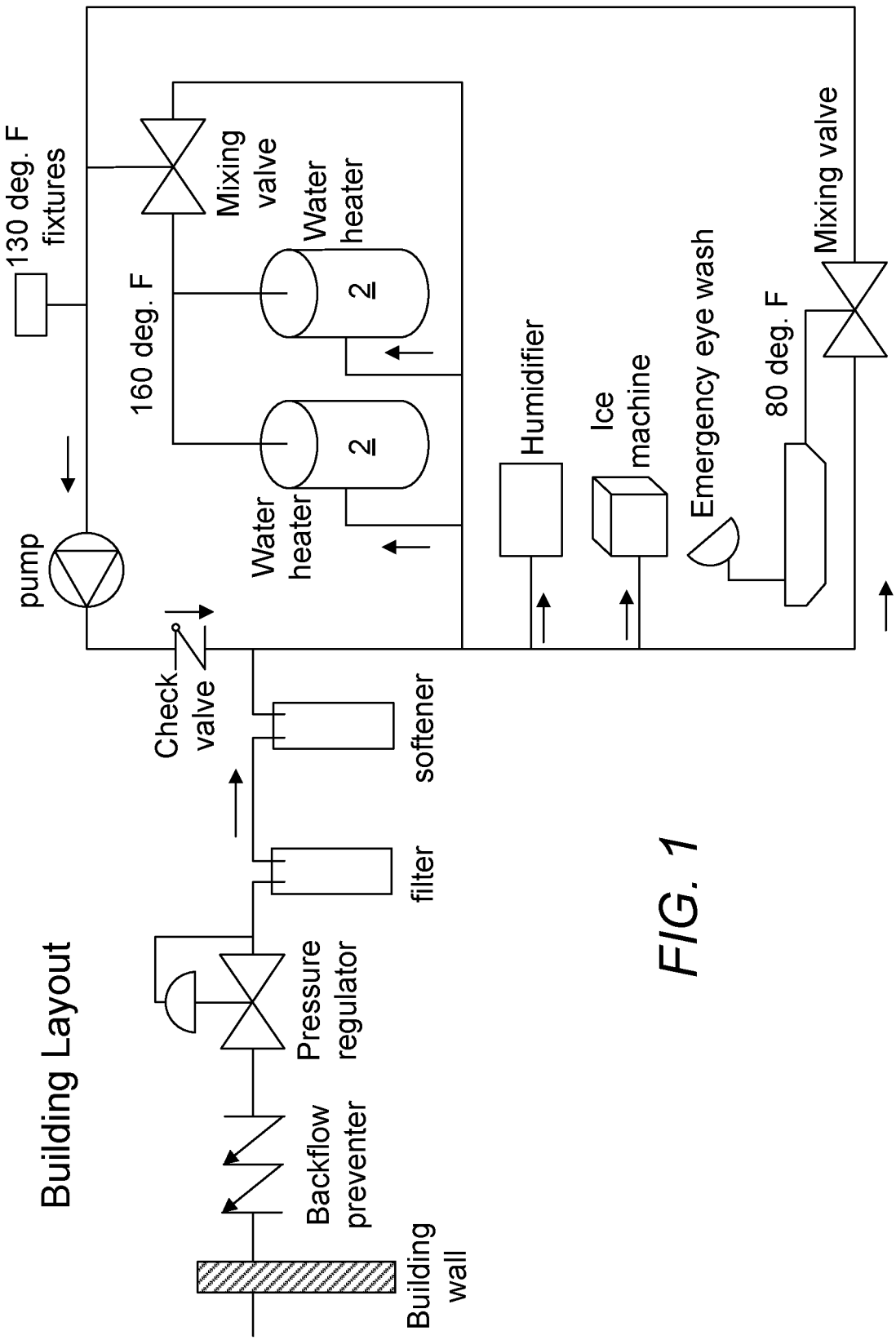
FIG. 1 is a diagram depicting water services of an establishment.

FIG. 1 is a diagram depicting water services of an establishment. A water service brought through the wall of a building is supplied to a number of equipment upon going through a number of devices, e.g., backflow preventer, pressure regulator, filter and softener. Note that the water service is networked for a variety of equipment, e.g., ice machine (e.g., at residences and hotels, etc.), humidifier, drinking fountain (e.g., for nursing homes, schools, colleges, malls and other public venues, etc.), water heater, emergency eye wash (e.g., for a laboratory, etc.), which may be distributed at several locations of the building. These equipment may be used at various frequencies and may represent sources of *Legionella* threat. For instance, a water heater may be used daily for hand washes, showers and other processes involving hot water. However, an emergency eye wash may be used only once in five years. An ice machine may be used once every few days or weeks. It shall be noted that as these equipment use water at different rates and at different temperatures, there could be one or more legs of the network in which *Legionella* can survive and thrive. In most water heaters, at least one flow sensor is provided for indicating a flow rate and at least one temperature sensor for indicating a temperature of the water demanded at one or more points of use.

Figure 2:
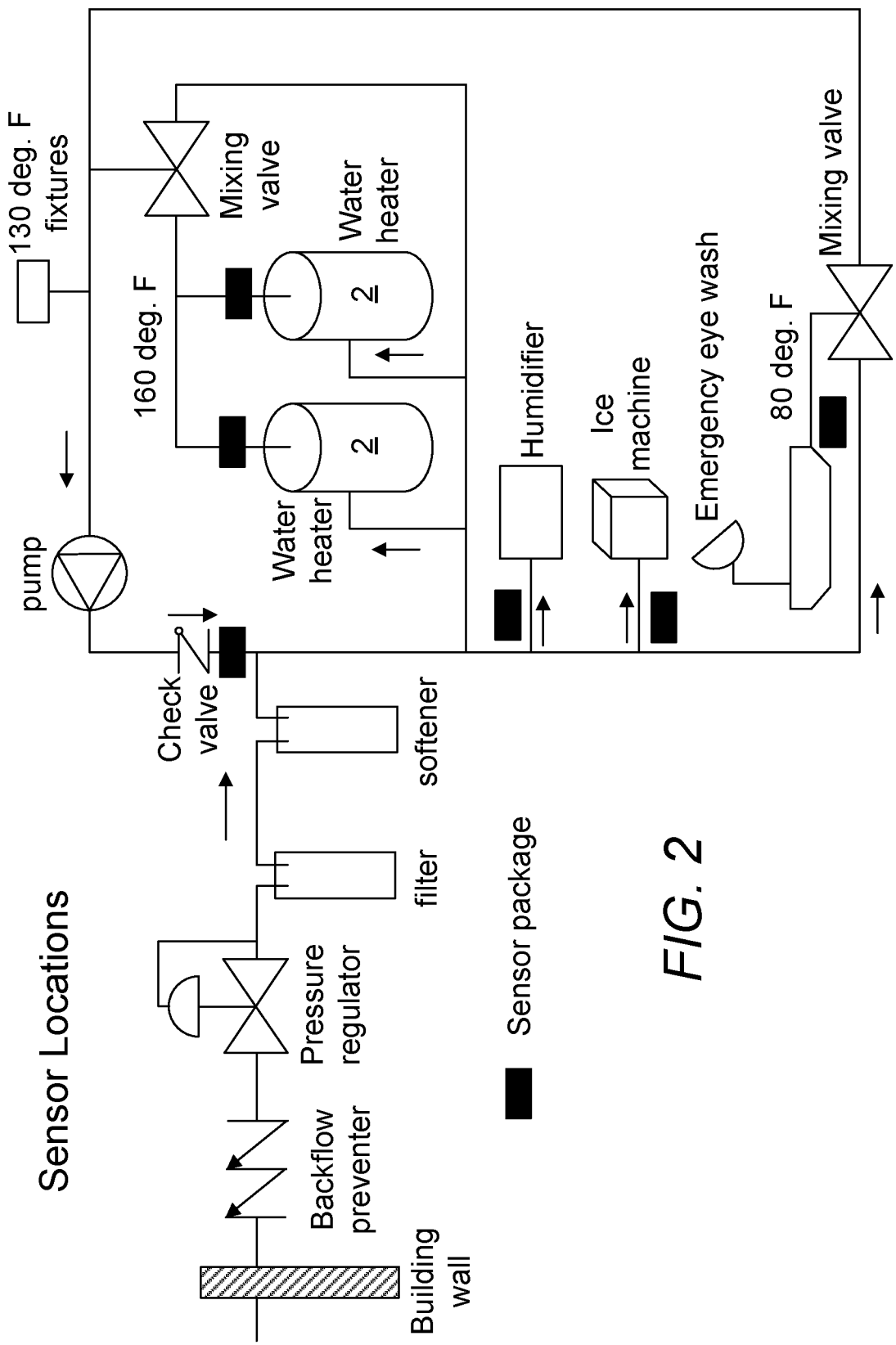
FIG. 2 is a diagram depicting locations at which sensors are disposed for water services of an establishment.

Regardless of whether the water heater is a tank or tankless water heater, an amount of water is held in the conductors receiving heat from a heat source or conductors leading to and from such heat source, although the amount of water held in a tank water heater is significantly more than the amount of water held in a tankless water heater and therefore significantly more susceptible to stratification and significantly more energy is expended to keep the water of the tank water heater at temperatures unsuitable for *Legionella* proliferation. Further, the cold side of the water supply does not receive heat directly from a dedicated heat source and typically is disposed at a temperature commensurate with the ambient temperature of the conductors. FIG. 2 is a diagram depicting locations at which sensors are disposed for water services of an establishment. Here, a sensor package may be coupled with an equipment such that parameters critical for determining a *Legionella* risk, are made available via one or more sensors of the sensor package. Such parameters may include temperature, flowrate or pressure of flow, etc., and may be obtained via a temperature, flowrate or pressure sensor. Data from these sensors may be communicated via hardwire or communicated wirelessly to a controller configured for determining the risk level for *Legionella* in a water service system. In one embodiment, the controller represents a hub that assesses *Legionella* risk in a water supply system. The hub monitors sensors configured for providing sensor data useful for *Legionella* risk assessment. The hub is capable of detecting a loss in communication with sensors whether or not the sensors are wired to the hub or remotely to the hub. In one embodiment, the controller is a purpose-built controller for receiving and acting on sensor data obtained from one or more sensors. In one embodiment, the controller may be part of a sensor package and functionally connected to one or more sensors of the sensor package and configured for receiving and acting on data from other sensor packages or the sensor/s of the its own sensor package.

Referring to FIG. 1, temperature, flow and pressure sensors may already be available in each water heater, eliminating the need for such sensors that are added to the water heaters via sensor packages. Sensor packages may alternatively or additionally be provided for water heaters as shown in FIG. 2. In one embodiment, in a water supply system in which the temperature of the fluid is modifiable, e.g., by a water heater, *Legionella* risk may be lowered or eliminated by circulating a volume of fluid contained in the water heater, e.g., in the fluid conductor/s within the water heater or in the fluid conductors connected to the water heater at about 70 degrees C. or higher for at least about 2 minutes to cause sufficient movement or turbulence of the fluid to prevent stratification and precipitation of solids on the interior surfaces of the fluid conductor/s. If the volume of fluid contained in the water heater is disposed at a temperature lower than about 70 degrees C., the volume of fluid is first raised to a temperature of about 70 degrees C. or higher before circulation is activated. If circulation is required and/or activated to raise the temperature of the volume of fluid contained in the water heater to about 70 degrees C. or higher, the duration of circulation upon achieving this desired temperature should still be at least about 2 minutes. Further, biofilm developed within fluid conductors of the water supply system may also be disrupted with increased flowrate, e.g., 10 Gallons Per Minute (GPM) or 8.5 ft/s, of the circulating fluid. During installation of the sensor packages, information is entered to locate each package with a subsystem of the water supply system, e.g., in terms of its relative location with respect to one or more subsystems of the water supply system, e.g., whether or not the subsystem is upstream or downstream from another subsystem. From a systemic viewpoint, as the location of sensors is known to belong to a subsystem, e.g., humidifier, ice machine, etc., an occurrence of a *Legionella* risk can then be located such that any treatment or actions that are to be taken can be targeted for specific location/s. For instance, if the sensor package downstream of a pump identifies a *Legionella* risk, only the upper loop upstream of the pump needs to be addressed. As another example, if the sensor package associated with an ice machine identifies a *Legionella* risk, only the section of the fluid conductor connected to the ice machine section needs to be addressed. However, if multiple subsystems are potentially affected by *Legionella*, the subsystems shall be all addressed starting from the subsystem disposed at the most upstream location first.

Figure 3:
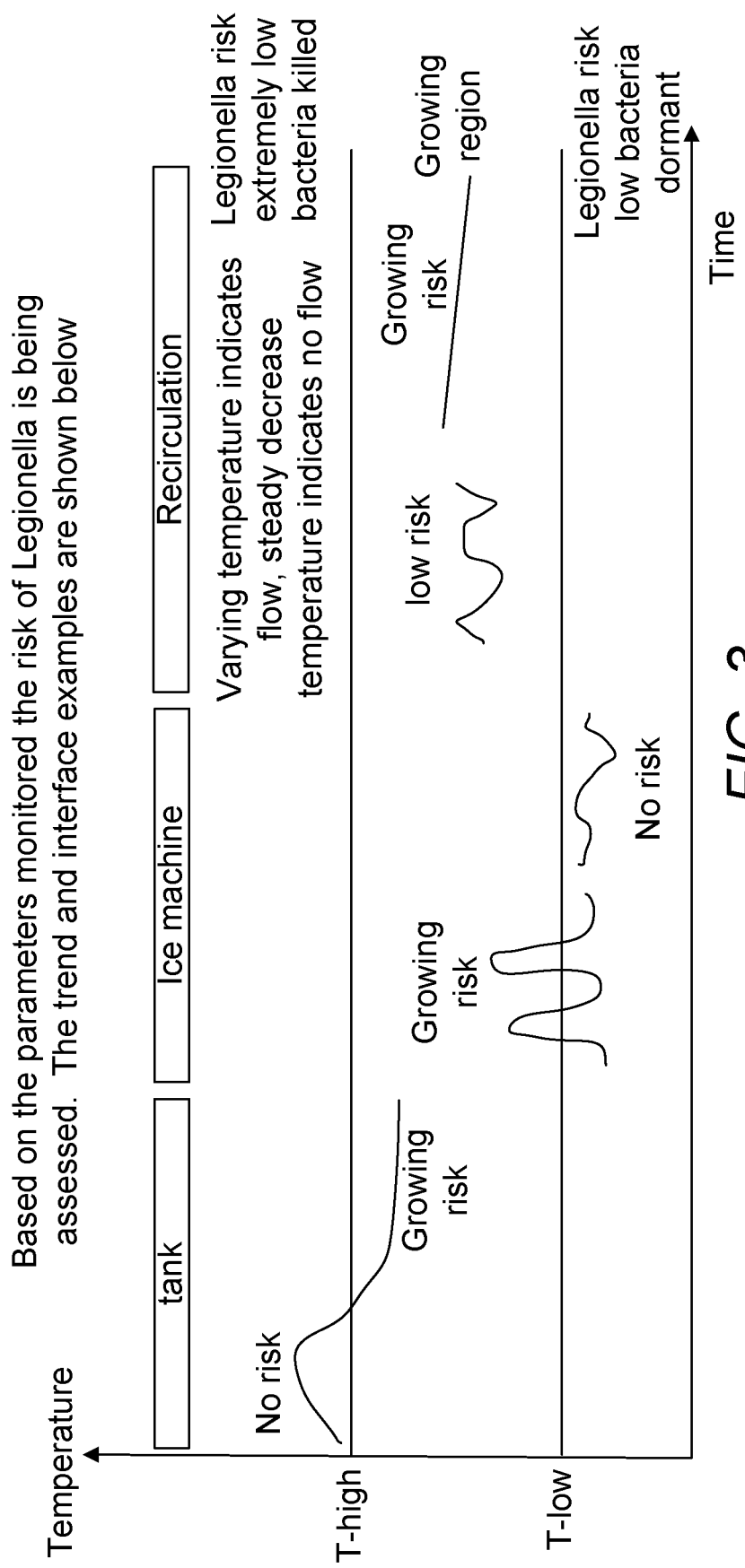
FIG. 3 is a chart depicting a plurality of temperature profiles of various circuits in a water supply system.

FIG. 3 is a chart depicting a plurality of temperature profiles of various circuits in a water supply system. Within the temperature range from T-low to T-high, *Legionella* has been known to survive and thrive. Above T-high, *Legionella* cannot survive and below T-low, *Legionella* remains dormant. Starting from the left side of the chart, an exemplary temperature profile is shown for the fluid held in the tank. Here, the fluid first experiences an increase in temperature to a point it exceeds T-high and then a drop to a point between T-low and T-high. While disposed above T-high, the fluid can be treated as having no risk of *Legionella* as it is killed. However, as the temperature of the fluid continues to drop below T-high but above T-low, the risk for *Legionella* proliferation continues to grow. In the middle of the chart, an exemplary temperature profile is shown for the fluid uses in an ice machine. This sawtooth-like temperature pattern fluctuates around T-low, i.e., a quantity of water disposed at a temperature above T-low is periodically sent to a compartment to be made into ice, the temperature of which then dips below T-low. When disposed below T-low, the supply of water runs no risk of *Legionella* proliferation. However, when disposed above T-low and when its temperature continues to rise, the risk for *Legionella* increases if *Legionella* exists in the water supply system. When its temperature continues to drop, the risk for *Legionella* decreases. On the right side of the chart, two recirculation scenarios, e.g., of an external recirculation system of a water heater, are depicted. First, if the temperature fluctuates within the T-high and T-low band, recirculation can be said to be effective as the temperature is kept to a level high enough such that when a demand suddenly exists, the water heater is capable to more quickly meet the hot water demand. However, a profile with steadily decreasing temperature indicates a no flow condition which can be said to be a growing risk for *Legionella* proliferation.

Figure 4:
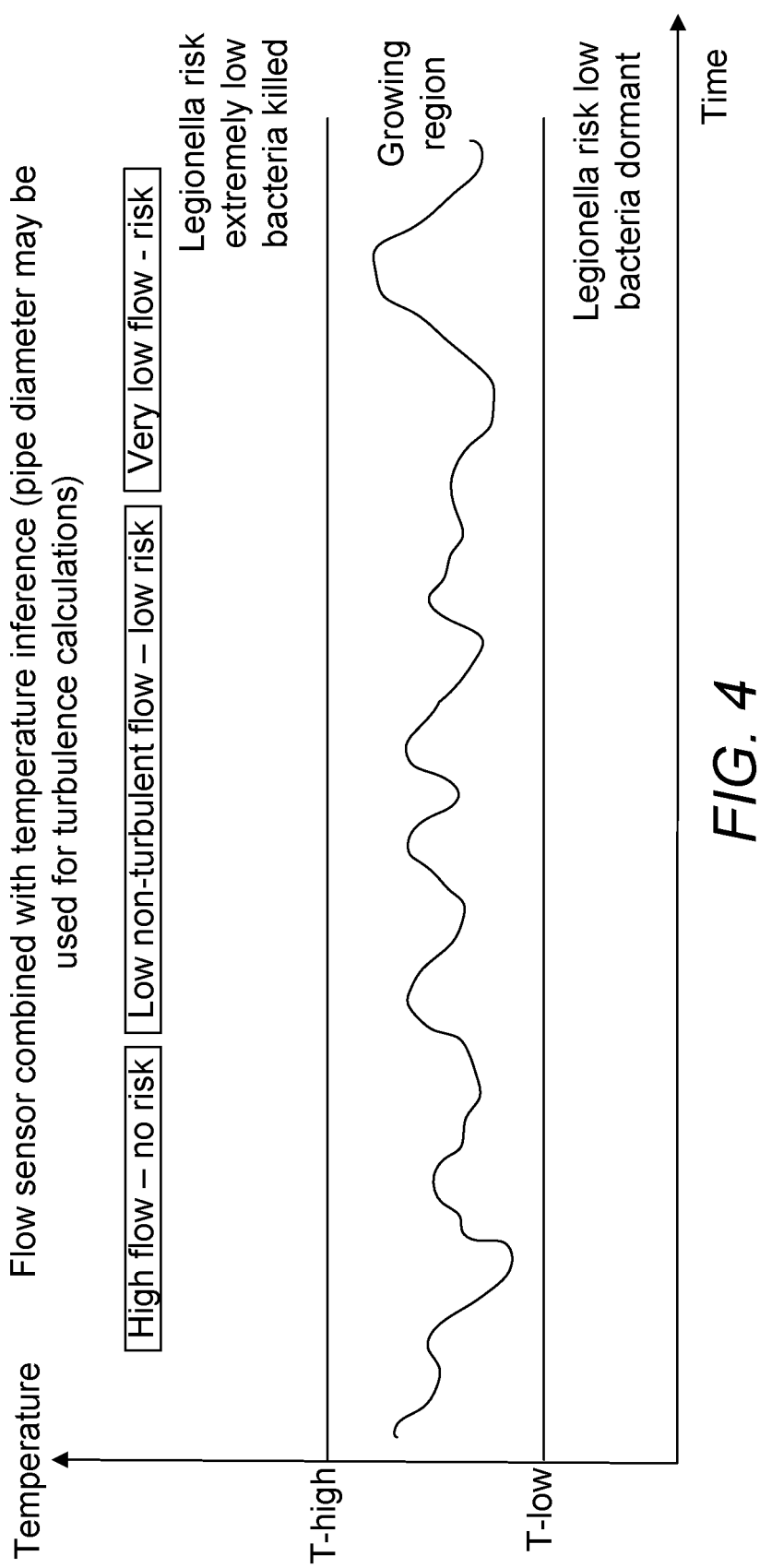
FIG. 4 is a chart depicting a plurality of temperature profiles in a water supply system.

FIG. 4 is a chart depicting a plurality of temperature profiles in a water supply system. Note that in this chart, from the perspective of temperature, all flows are disposed within a temperature band where *Legionella* can thrive. However, a risk for *Legionella* may be assessed based on the type of flow that occurs in the fluid system. A fluid flow that registers temperatures fluctuating greatly, indicates a turbulent flow or a flow that is well-mixed. Such a flow carries no risk of *Legionella*. At a lower flowrate, the flow becomes non-turbulent and its temperature fluctuations become less severe. This translates to a low *Legionella* risk. Then at a very low flow, heating of the flow causes the temperature of the flow to rise slowly and the removal of heating of the flow causes its temperature to drop slowly as well. At a low flow, the risk of *Legionella* proliferation is deemed high.

Therefore, it can be summarized that a high flowrate decreases the risk of *Legionella* while a low flow raises the risk when the fluid temperature falls within a range of temperature *Legionella* is thought to survive and thrive. In providing a warning of the risk of *Legionella* in a fluid conductor, the flowrate of a fluid in a fluid conductor needs to be determined first and then the flowrate is checked against a threshold below which a *Legionella* risk is known to exist. Therefore, in providing a warning of the risk of *Legionella* in a fluid conductor, the percentage of a duration the fluid is disposed in the fluid conductor at a temperature in which *Legionella* can thrive during a period, is determined. If the percentage of the duration is greater than about 50% of the period, a first indication of a risk of *Legionella* is raised. In one embodiment, if a fluid flow is disposed at both a temperature range in which *Legionella* can survive and thrive and a temperature outside of this range, the method further includes identifying a flow volume per unit period of a fluid through the fluid conductor; and the flow volume per unit period is compared to a threshold, wherein if the flow volume per unit period is less than the threshold, a second indication of a risk of *Legionella* is raised. The second indication of a risk of *Legionella* shall indicate a risk level of *Legionella* that is higher than the first indication. In computing the flow volume of a fluid, flowrates are integrated over time. In other words, as flowrates may change over time during each demand, the volume of fluid that moves through a conductor can be calculated by summing segments of a flow at different flowrates. For each segment, the magnitude of a flowrate is multiplied by the duration in which the flow occurs at that magnitude. In one embodiment, the period is about 6 hours. In one embodiment, the threshold is the total fluid volume of the fluid conductor within the period.

In one embodiment, the method further includes activating a mitigating mechanism where a fluid considered unsuitable for human consumption due to a *Legionella* risk may be drained. In one embodiment, a warning indicating that the volume of the fluid in the fluid conductor should be drained or replaced is raised if the first indication of a risk of *Legionella* is raised. In another embodiment, a warning indicating that the fluid in the fluid conductor should not be consumed by humans without further treatment, is raised if the first indication of a risk of *Legionella* is raised.

Figure 5:
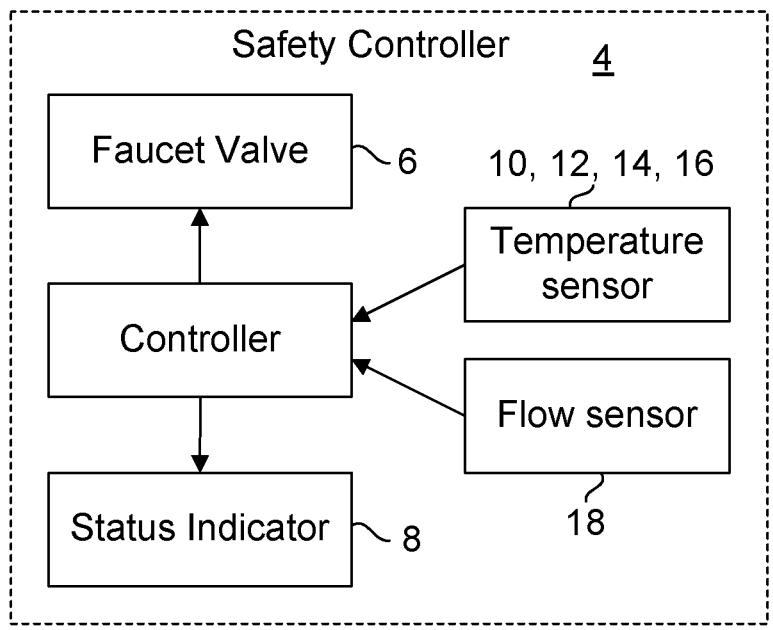
FIG. 5 is a diagram depicting a faucet control system including a warning system.
Figure 6:
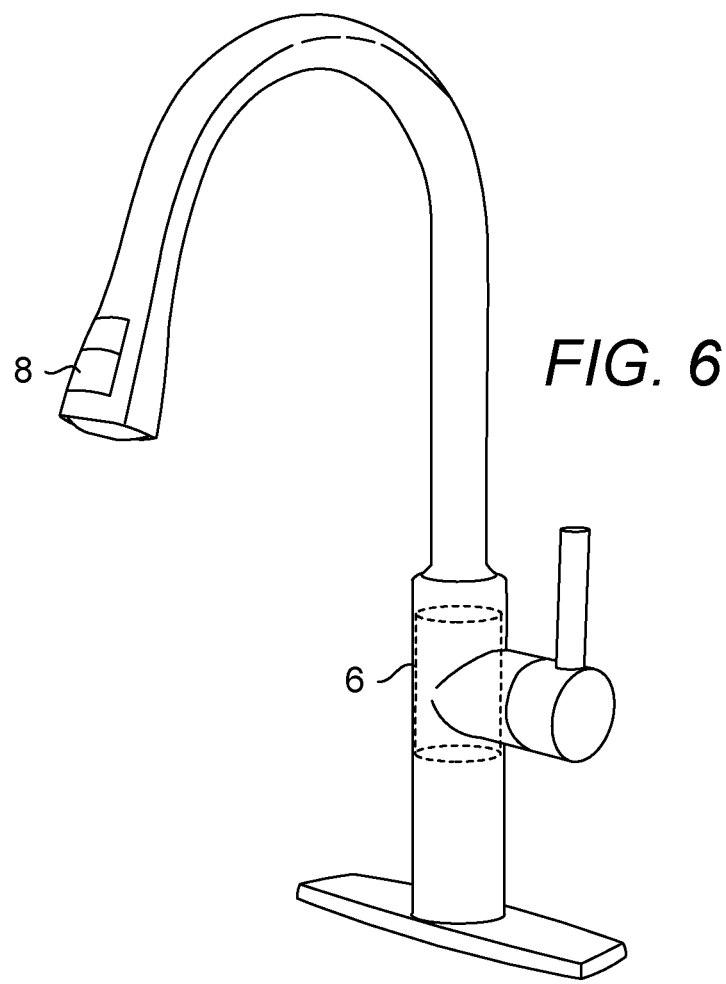
FIG. 6 is a diagram depicting an example implementation of a faucet control system including a warning system.

FIG. 5 is a diagram depicting a faucet control system including a warning system. FIG. 6 is a diagram depicting an example implementation of a faucet control system including a warning system. As disclosed elsewhere herein, there may be circumstances where a stagnant fluid in a fluid conductor will need to be drained prophylactically or in response to a current *Legionella* risk. A safety controller 4 may be functionally coupled with another controller in a water supply system, e.g., a controller of a water heating system or alternatively, a water heating system may be equipped with a controller configured to carry out functions of a safety controller as shown herein. The safety controller 4 serves as a "gate keeper" for a point of demand as it controls whether or not a supply can be provided when demanded by a user. In one embodiment, the safety controller 4 prevents a supply of fluid when demanded if *Legionella* risk is deemed too high. In another embodiment, the safety controller 4 delays a supply of fluid after the supply is demanded such that the user does not inadvertently use the fluid supply deemed unsafe for the user. A temperature sensor and a flow sensor 18 are shown to provide input to a controller. They need not be connected directly to the controller. The temperature and/or flow sensors may be the same sensors already provided in a water heating system and transmitted wirelessly to the controller of the safety controller 4. Valve 6 may be a valve configured to control a supply of water at a point of demand, e.g., a faucet. The valve may be integrated with the faucet or the valve may be mounted elsewhere as long as it is capable of controlling whether water is supplied at the point of demand. The removal of a fluid from a conductor causes fresh water to replace it in the conductor, lowering the possibility of a *Legionella*-inflicted fluid is inadvertently communicated to a user if from the conductor. At minimum, a conductor suspected of *Legionella* proliferation should be fully drained, i.e., with a complete replacement or replacement of a full volume of the fluid in the fluid conductor. A conductor is preferably cleared of the previously held water in multiplicity of volumes of fluid held in the conductor. For instance, if a conductor holds 2 gallons of water, a volume provided to flush the conductor will be twice, i.e., multiplicity of this amount, i.e., two times of two gallons or four gallons. In one embodiment, *Legionella* risk is mitigated, e.g., by draining the fluid conductor, any time *Legionella* risk is deemed to have risen to a certain level. In another embodiment, mitigation is performed at the time a demand for the fluid is made, e.g., a faucet configured to drain the fluid is turned on, i.e., valve 6 is opened for a certain predetermined amount of time or until a certain predetermined volume is thought to have been drained, etc. Regardless of the time a risk is mitigated, it may be important to warn a user of a fluid supply that is unsuitable for human consumption without further treatment. It can be summarized that, in mitigating the risk of *Legionella* in a fluid conductor, the volume of fluid in a fluid conductor shall be replaced at least once during a period, e.g., about 3 hours. In one embodiment, a warning is provided by using a status indicator 8 to indicate whether or not a supply of water at a faucet is safe for use. In one embodiment, the status indicator 8 is a visual indicator configured to display colors indicating whether or not the fluid exiting the faucet should be used. For instance, a green-colored light may be used to show that the fluid can be safely used by humans without further treatment while a red-colored light may be used to indicate that the fluid should be discarded or it should be treated or boiled before use. Indicators of other types may also be used instead of the visual indicator, e.g., an audio indicator that warns user to avoid using the fluid exiting the faucet. If the temperature of a fluid is known to be disposed in a certain range in which *Legionella* is known to survive and thrive, the use of a temperature sensor is optional in determining the *Legionella* risk.

Figure 7:
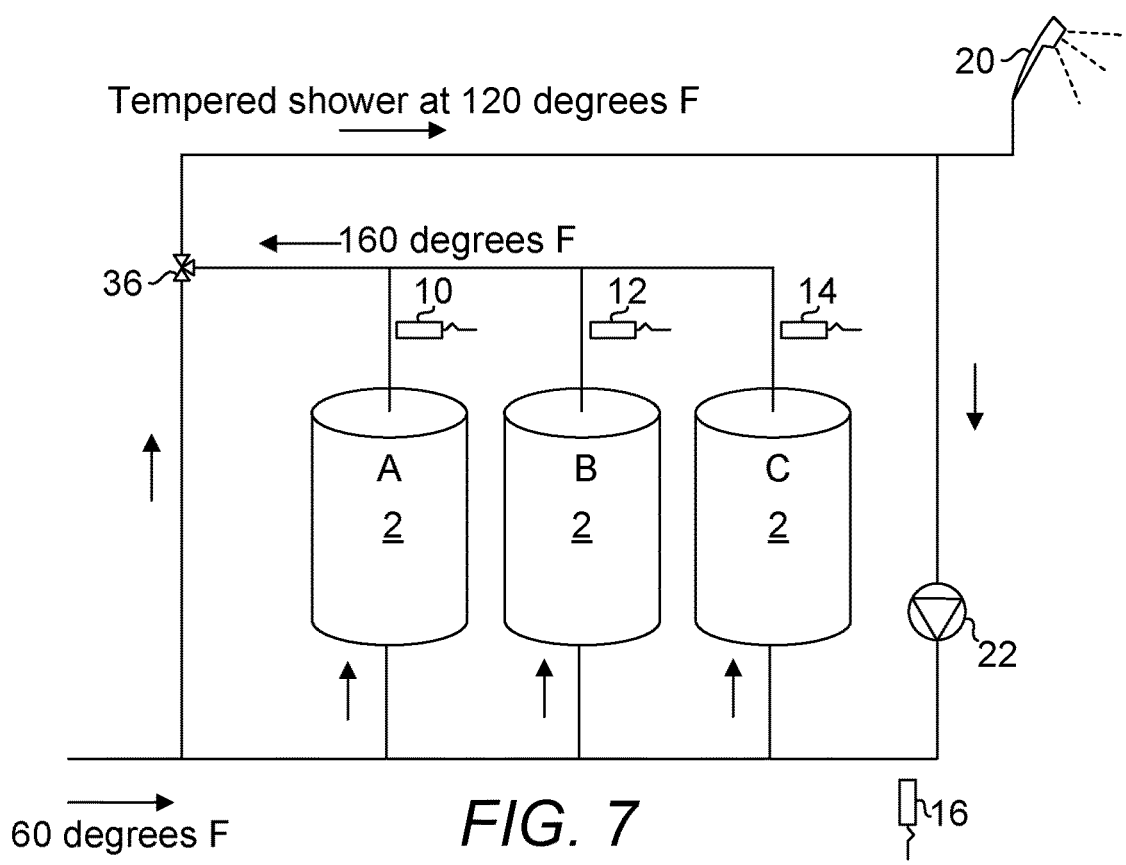
FIG. 7 is a diagram depicting a heating system having multiple heaters and a pump.
Figure 8:
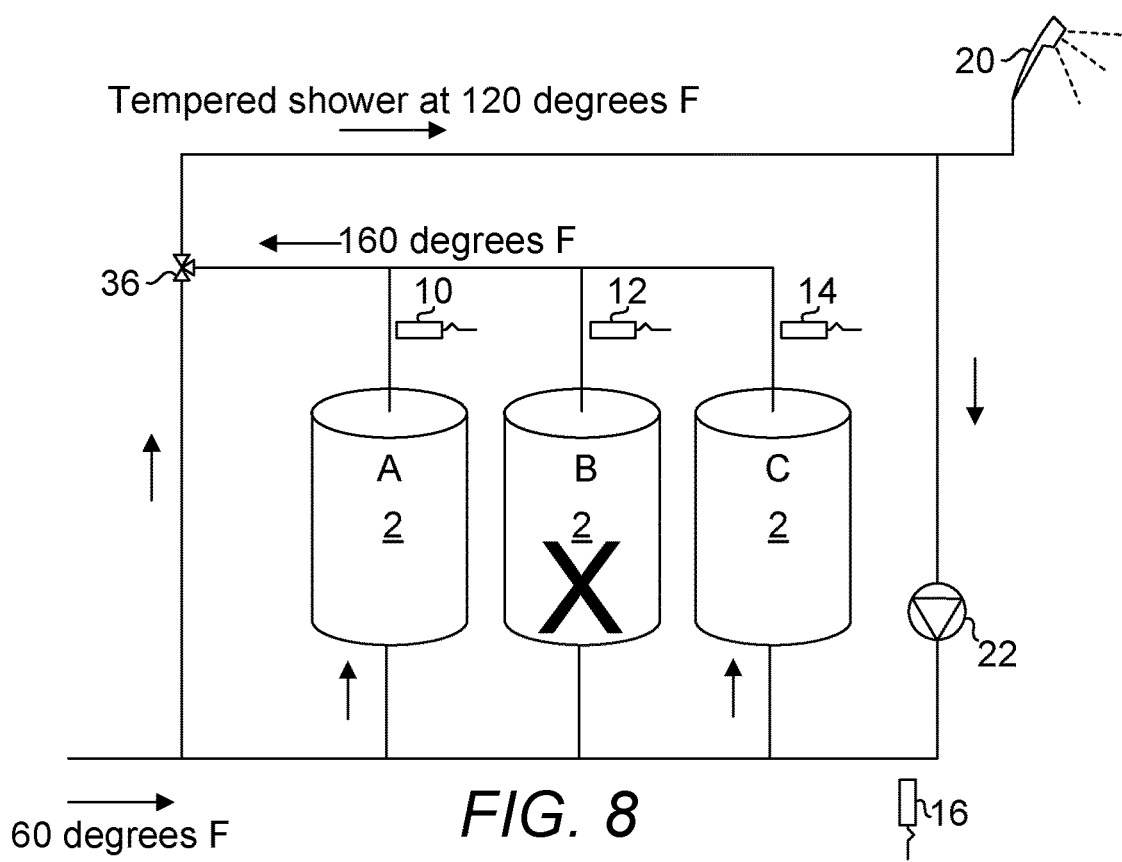
FIG. 8 is a diagram depicting a heating system having a heater that has malfunctioned.
Figure 9:
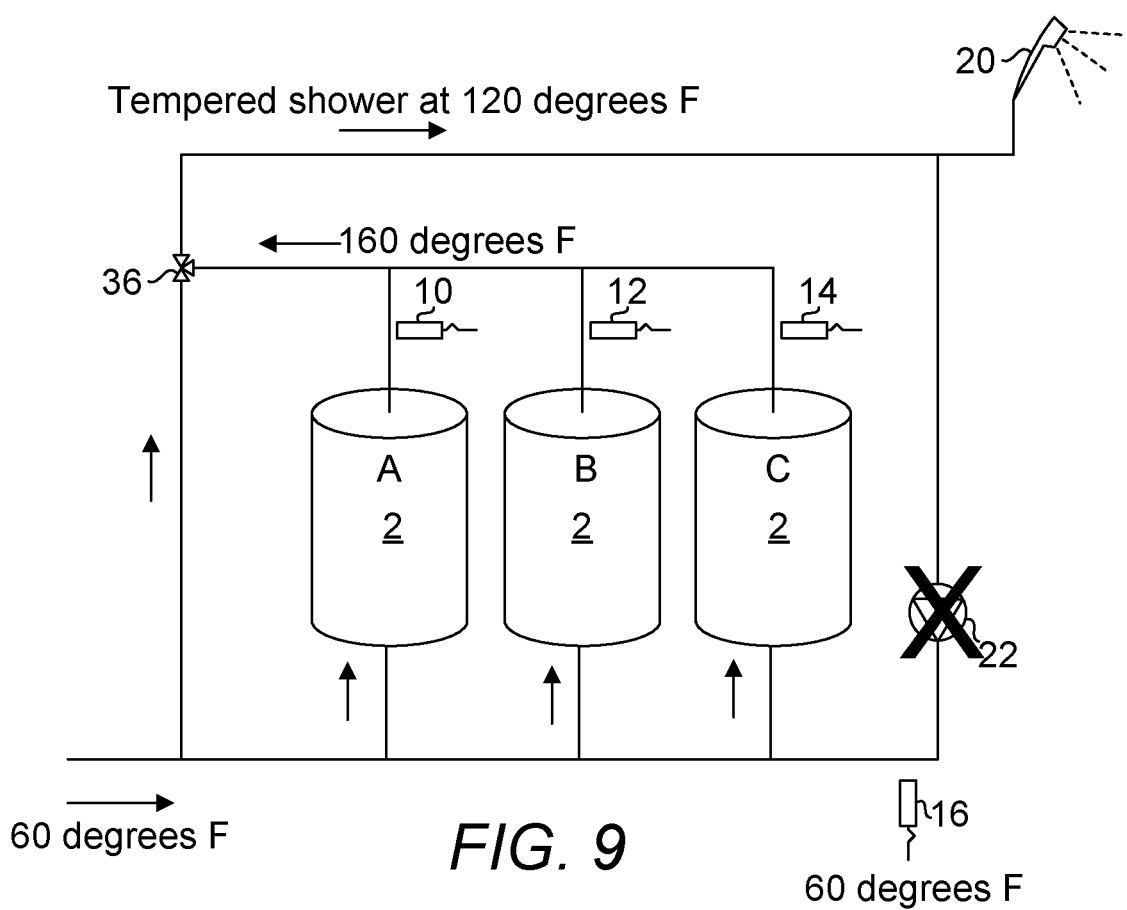
FIG. 9 is a diagram depicting a heating system having a pump that has malfunctioned.
Figure 10:
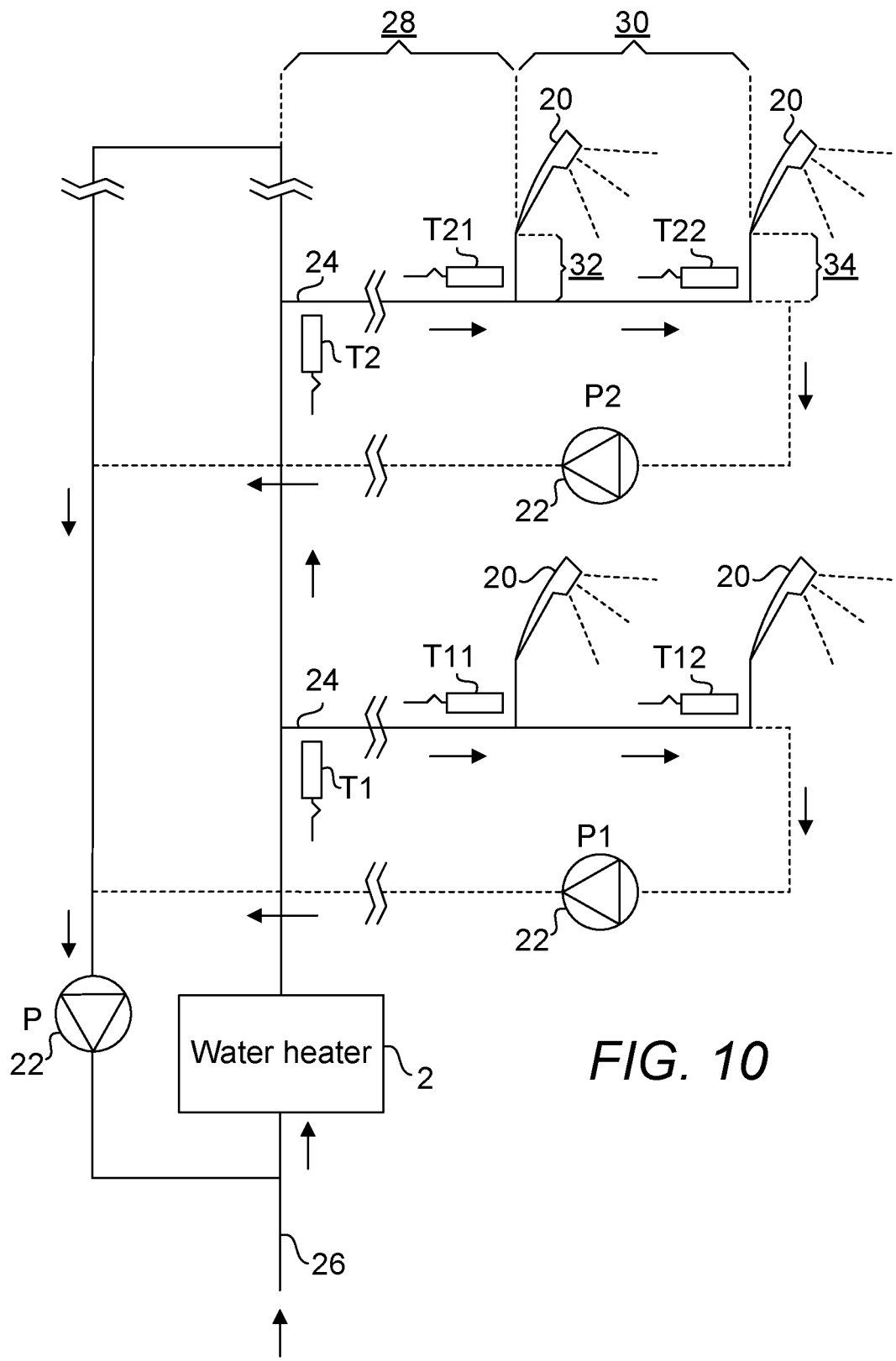
FIG. 10 is a diagram depicting a heating system where problematic points of use can be identified.

FIG. 7 is a diagram depicting a heating system having multiple heaters and a pump. FIG. 8 is a diagram depicting a heating system having a heater that has malfunctioned. FIG. 9 is a diagram depicting a heating system having a pump that has malfunctioned. The arrows shown in FIGS. 7-9 are used to indicate flows. The flows may not occur all at the same time but with all devices 2, i.e., "A," "B," and "C" functioning as shown in FIG. 7, it is possible for each flow to occur when valve 36 is disposed in an open position. Referring back to FIG. 7, the diagram depicts a heating system having multiple heaters 2 disposed in parallel, a pump 22 disposed on a recirculation line to cause a recirculation flow through the pump 22 where the flow is merged with a flow through one or more devices 2, i.e., "A," "B," and "C." Temperature sensors 10, 12, 14 and 16 each indicates the temperature of the respective flows at the locations indicated. As a demand exists at a point of use 20, each of the heaters 2 labelled "A," "B," and "C" is capable of contributing to providing a heated output at about 71.1 degrees C. (160 degrees F.) before being tempered to about 48.9 degrees C. (120 degrees F.) prior to a shower. However, if a heater 2 has malfunctioned in the system, other heaters can continue to provide water heating at the desired temperature as shown in FIG. 8. Referring back to FIG. 8, the diagram depicts a heating system having a heater that has malfunctioned and its valve closed to prevent a flow through it. There is now no flow through heater "B" and therefore the fluid that remains in the failed heater will be disposed at a temperature suitable for *Legionella* proliferation. The present system allows for this condition to be detected. Each of temperature sensors 10 and 14 detects a flow disposed at about 71.1 degrees C. (160 degrees F.) while temperature sensor 12 registers a temperature disposed in a range suitable for *Legionella* proliferation. Left unchecked, the compromised water left in heater "B" and its connecting conductors can be inadvertently sent to the point of use 20 to result in a health risk to the user. For instance, during the start of a demand, heater "B" that is now repaired, can cause the *Legionella*-compromised water that has been retained in heater "B" to be sent the point of use 20. Upon detecting a malfunctioned heater over an extended period of time or an amount of time the water left in heater "B" is thought to have been disposed at a temperature suitable for *Legionella* proliferation, an indication of a risk of *Legionella* is raised. Referring back to FIG. 9, the diagram depicts a heating system having a pump 22 that has malfunctioned. Here, as the pump 22 has failed, no recirculation will occur through the recirculation line on which the pump 22 is disposed. Left unchecked, the water left in the recirculation line will then be disposed at a temperature suitable for *Legionella* proliferation. There are two ways a failed pump condition can be detected. First, a failed pump will cause the recirculation line temperature to eventually settle at the cold water inlet temperature of 15.6 degrees C. (60 degrees F.) as shown in FIG. 10. Second, a failed pump will cause the temperature response of the recirculation line to assume a temperature-time line that shows a consistently downward trending temperature as compared to a flow with fluctuating temperatures as water begins to be sent through the bypass line and eventually settling at about 48.9 degrees C. (120 degrees F.) as the bypass flow continues. Upon detecting this condition, an indication of a risk of *Legionella* is raised.

FIG. 10 is a diagram depicting a heating system where problematic points of use can be identified. In this example, only two faucets 20 are shown connected to each riser 24 and only two risers 24 are shown. A riser 24 can be thought of as being associated with a story of a building. As there are two risers 24 shown, this system is suitable for a two-story building. In this example, the labels '1' and '2' are each used for indicating a story, wing and area, etc. However, it can be seen that such a system can be expanded to cover multi-story buildings each story having many more faucets or points of use that can potentially cause *Legionella* transmission to human beings. A temperature sensor is disposed at each riser 24 and each point of use, e.g., faucet 20. For instance, assuming that each riser 24 represents a story of a building, a temperature sensor useful for reporting the temperature of the flow through the riser 24 as T2, a temperature sensor useful for reporting the temperature of the flow through a first faucet 20 as T21 and a second faucet 20 as T22 are provided for the second story. Likewise, a temperature sensor useful for reporting the temperature of the flow through the riser 24 as T1, a temperature sensor useful for reporting the temperature of the flow through a first faucet 20 as T11 and a second faucet 20 as T12 are provided for the first story. A water heater 2 receives a supply of cold water at inlet 26 where the water heater 2 is used for making available hot water delivered to faucets 20 when requested therefrom. In one embodiment, recirculation can occur through each riser 24 if a recirculation line (as shown in a broken line) and a pump is provided along with a pump P1 or P2, thereby enabling recirculation through a path close to each point of use 20 on the riser 24 for bringing hot water close to each point of use 20. A riser 24 without the possibility of a recirculation flow runs the risk of *Legionella* proliferation especially if points of use 20 are disposed at distant reaches of the riser 24. By monitoring the temperature of the flow at each point of use 20 and the riser 24, the risk of *Legionella* proliferation can be assessed and such risk can be associated with a "leg" of the fluid conductor which is at risk of *Legionella* proliferation. For instance, if T2 is disposed at a temperature unsuitable for *Legionella* proliferation within a period of about 6 hours and T21 has been disposed at a temperature suitable for *Legionella* proliferation within this period, sections 28 and 30 of the riser 24 can be said to be unsuitable for *Legionella* proliferation but section 32 can be said to be suitable for *Legionella* proliferation. If T22 has been disposed at a temperature unsuitable for *Legionella* proliferation within this same period, section 34 can be said to be unsuitable for *Legionella* proliferation. By having this knowledge, the risk of *Legionella* proliferation in various sections of the riser 24 can be selectively mitigated. For instance, if only section 32 is deemed to be disposed at a high risk of *Legionella* proliferation in fluid conductors connected to the riser 24 for the second story, the amount of flow that shall be discarded via faucet 20 connected to section 32 will be the amount of flow equal to the amount of fluid capable to be held within section 32.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for providing a warning of a risk of *Legionella* in a fluid conductor, said method comprising determining a percentage of a duration in which a fluid is disposed in the fluid conductor at a temperature in which *Legionella* can thrive during a period, identifying a flow volume of the fluid through the fluid conductor during said period to yield a flow volume per unit period; and comparing said flow volume per unit period to a threshold, wherein if the percentage of said duration is greater than about 50% of said period, a first indication of the risk of *Legionella* is raised and if said flow volume per unit period is less than said threshold, a second indication of the risk of Legionella is raised.

2. The method of claim 1, wherein said threshold is a total fluid volume of the fluid conductor within said period.

3. The method of claim 1, wherein said period is about 6 hours.

4. The method of claim 1, further comprising providing a second warning indicating that the fluid in the fluid conductor should be replaced if said first indication is raised.

5. The method of claim 1, further comprising providing a second warning indicating that the fluid in the fluid conductor should not be consumed by humans without further treatment if said first indication of the risk of Legionella is raised.

6. A method for mitigating a risk of Legionella in a fluid conductor in a period, said method comprising:
   identifying a flow volume of a fluid through the fluid conductor during said period to yield a flow volume per unit period; and comparing said flow volume per unit period to a threshold, if said flow volume per unit period is less than said threshold, an indication of the risk of Legionella is raised; and
   replacing the fluid in the fluid conductor at least once during a period.

7. The method of claim 6, wherein said period is about 3 hours.

8. The method of claim 6, further comprising:
   providing a warning indicating that the fluid in the fluid conductor should not be consumed by humans without further treatment.

9. A method for mitigating a risk of Legionella in a fluid conductor in a period, said method comprising:
   (a) identifying a flow volume of a fluid through the fluid conductor during said period to yield a flow volume per unit period; and comparing said flow volume per unit period to a threshold, if said flow volume per unit period is less than said threshold, an indication of the risk of Legionella is raised;
   (b) ensuring a volume of fluid contained in the fluid conductor is disposed at a temperature of at least about 70 degrees C.; and
   (c) circulating the volume of fluid for at least about 2 minutes.

* * * * *